June 23, 1925.
M. HATCHER
MIRROR MOUNTING FOR DRESSERS
Filed Feb. 13, 1924  2 Sheets-Sheet 1
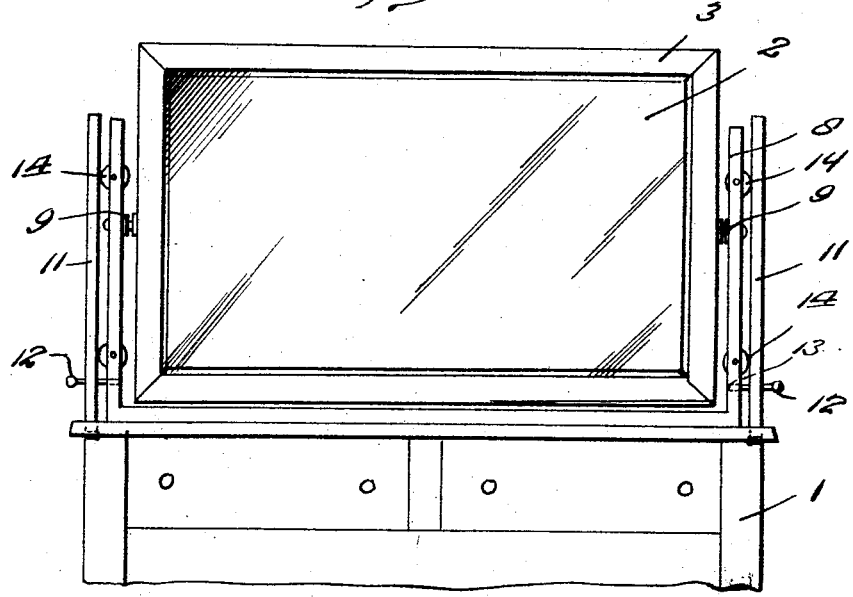
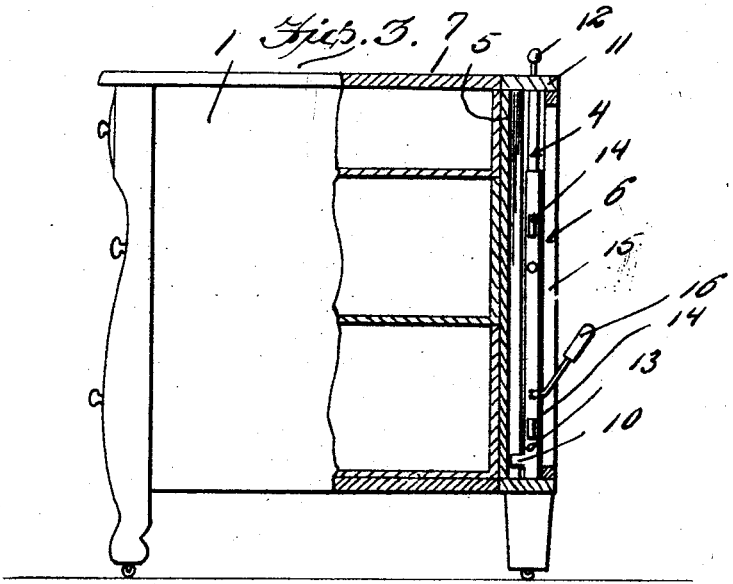
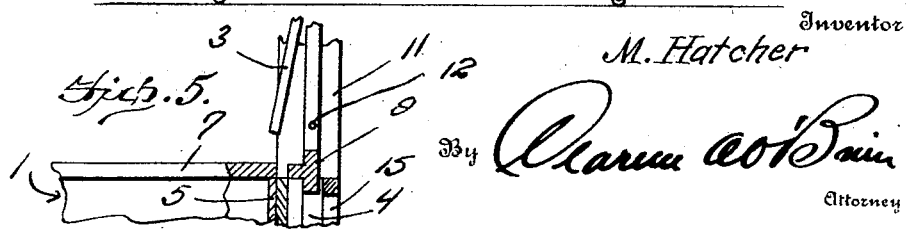
Inventor
M. Hatcher
Attorney June 23, 1925.  
M. HATCHER  
MIRROR MOUNTING FOR DRESSERS  
Filed Feb. 13, 1924  
1,543,499  
2 Sheets-Sheet 2
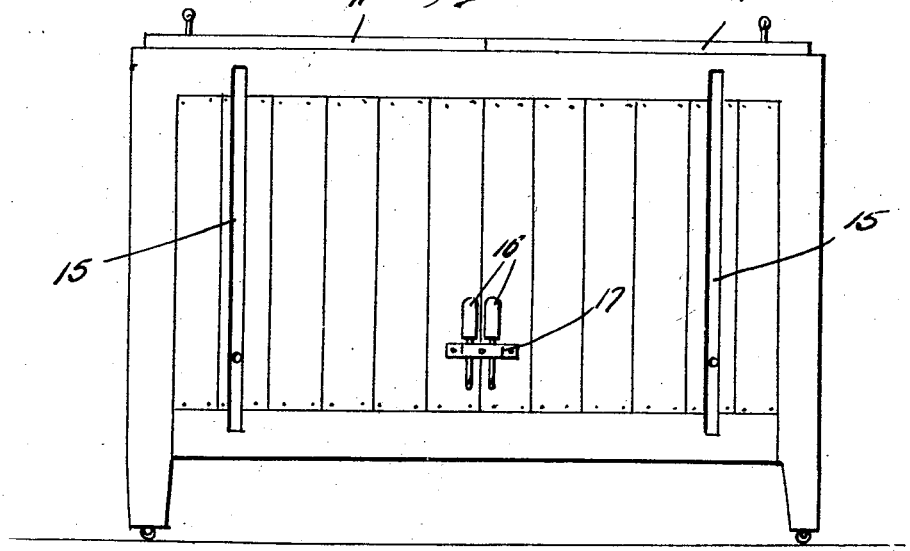
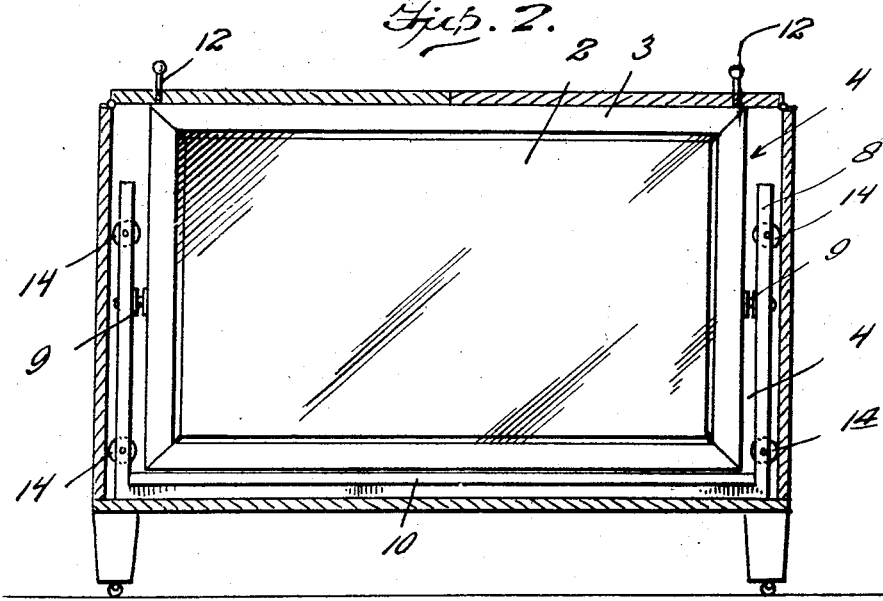

Patented June 23, 1925.

1,543,499

UNITED STATES PATENT OFFICE.

MATT HATCHER, OF SIPSEY, ALABAMA; ALICE HATCHER ADMINISTRATRIX OF SAID MATT HATCHER, DECEASED.

MIRROR MOUNTING FOR DRESSERS.

Application filed February 13, 1924. Serial No. 692,564.

*To all whom it may concern:*

Be it known that I, MATT HATCHER, a citizen of the United States, residing at Sipsey, in the county of Walker and State of Alabama, have invented certain new and useful Improvements in Mirror Mountings for Dressers, of which the following is a specification.

This invention relates to improvements in mirror mountings for dressers and the like, and particularly to a construction wherein the mirror support is movable into or out of a pocket formed in the back of a dresser so that the mirror may be housed therein during transportation of the dresser from point to point.

An object of the invention resides in providing a bureau, dresser and other similar pieces of furniture on which are usually mounted mirrors, with a suitable mirror support having a movable mounting in the dresser or the like, adapted to be moved downwardly in a compartment formed in the back of the piece of furniture for completely housing the mirror and the support in the compartment and thereby prevent breakage of the same when the piece of furniture is being moved from place to place.

Another object of the invention resides in providing means for easily moving the mirror into projected position and for securing the supporting frame in rigid relation in this position.

The invention also comprehends other improvements in the details of construction and arrangement of the parts which are more particularly described in the following description and claims, setting forth a preferred form of the invention, it being understood, however, that variations in the details of the construction may be made without departing from the scope and spirit of the invention as claimed.

In the drawing, forming a part of this application:

Figure 1 is a front elevation of the upper portion of a dresser or other piece of furniture to which the mirror mounting is applied and in which the mirror is shown in its projected position in relation to the furniture.

Figure 2 is a longitudinal sectional view through the mirror receiving pocket in the rear portion of the piece of furniture showing the mirror and its support housed in the rear end.

Figure 3 is an end elevation of the piece of furniture with the mirror in housed position, parts being broken away and shown in section for illustrating the manner of housing the mirror and its support.

Figure 4 is a rear elevation of the piece of furniture with the mirror in housed relation therewith.

Figure 5 is a partial transverse sectional view showing the manner in which the bottom of the mirror support cooperates with the upper open end of the compartment to substantially close the upper open end of said compartment when the mirror is in extended relation.

1 indicates a piece of furniture, such as a dresser, bureau, or the like, on which is usually mounted a suitable form of mirror indicated at 2 having a frame 3, the mirror being ordinarly pivoted so that the angular relation with respect to the dresser or other piece of furniture may be changed at will.

In the present invention, the rear portion of the dresser is provided with a compartment 4 which is formed by a partition wall 5 arranged in spaced relation inwardly of the rear wall 6 of the dresser, the top portion 7 thereof terminating at the rear end adjacent the end of the partition wall 5, so that the upper end of the pocket 4 is open for receiving the U-shaped supporting frame 8 which supports the mirror 2 through the frame 3 on suitable pivot pins 9 extending through the legs of the frame 8 at opposite ends of the mirror as clearly shown in Figure 1 for mounting the mirror therein so that the same may be swung on a horizontal pivot when in extended position. The frame 8 is provided with a laterally projecting flange 10 on the front face of the lower end portion thereof as clearly shown in Figures 3 and 5 for completely filling the upper open end of the pocket 4 when the frame is in extended relation as shown in Figures 1 and 5.

A pair of pivoted cover sections 11 are mounted at opposite ends on the side walls of the dresser and in the rear of the top portion 7, adapted to be swung downwardly toward each other to close the compartment 4 at the upper end when the mirror is in housed relation therein so that the top of the bureau or other piece of furniture will be continuous throughout to the back wall thereof. Each of these cover sections 11 are provided with operating members 12 which are screw threaded in the sections and adapted for movement to serve as locking members for engagement in screw threaded openings 13 in the legs of the U-shaped supporting member 8 so that when the mirror and supporting frame are in extended position as shown in Figure 1, the cover sections 11 will move on their hinged connections with the sides of the piece of furniture into a vertical position as shown in Figure 1 and the locking members 12 can therefore be easily extended into the openings 13 to support the frame 8 in extended position to hold the mirror above the top 7 of the furniture. Rollers 14 are mounted in spaced relation in the legs of the U-shaped supporting member 8 so that the member may be easily moved in and out of the pockets 4. The rear wall 6 of the piece of furniture is provided with vertical slots 15 adjacent opposite ends thereof for the insertion of lifting members 16 normally carried in a bracket 17 on the rear wall of the piece of furniture which are adapted to have their laterally extended free ends inserted into openings in the back of the mirror or supporting frame through which the mirror and supporting frame may be moved into the raised position shown in Figure 1, it being understood that the hinged sections 11 are opened before these lifting members are applied for raising the mirror and its supporting frame. The mirror and frame, after being raised are held in the raised position until the locking members 12 can be applied as above described for locking the supporting frame 8 in its projected position.

From the foregoing description, it will thus be seen that a simple and convenient form of structure has been provided for pieces of furniture with which mirrors are usually associated, so that the mirrors may be moved into a pocket at the rear of the piece of furniture for protecting the mirror during the movement of the furniture from place to place.

What is claimed is:

1. In an article of the class described, a piece of furniture having a pocket formed adjacent the rear wall thereof, a supporting frame, a mirror pivotally mounted in said supporting frame, said mirror and frame being movable as a unit into said pocket and adapted to be completely housed therein, a pair of hinged cover sections for the open upper end of the pocket, said sections being adapted to be moved into substantially vertical position to open the pocket, means for raising the mirror and frame into projected position above the top of the piece of furniture, and locking means carried by the hinged sections for engagement with the frame adapted to lock said frame in projected position, said locking means also serving as operating means for the hinged section.

2. A device of the class described including a piece of furniture having a partition wall therein spaced from the rear wall to form a pocket having an open upper end, a U-shaped frame movable in said pocket, a mirror mounted in said frame, said mirror and frame being adapted to be completely housed within the pocket, a pair of hinged cover sections adapted to close the upper end of the pocket, operating means for the cover section, and means for raising the mirror and frame into projected position above the piece of furniture, said operating means being adapted for engagement with the U-shaped frame for locking said frame in projected position.

In testimony whereof I affix my signature.

MATT HATCHER.